(12) United States Patent
Tseng et al.

(10) Patent No.: US 6,496,244 B2
(45) Date of Patent: Dec. 17, 2002

(54) STORING STRUCTURE FOR DOCUMENT CAMERA

(76) Inventors: Kou-Lung Tseng, 5F, No. 35, Shintai Rd., Jubei City, HsinChu (TW); Wolf Wang, 5F, No. 35, Shintai Rd., Jubei City, HsinChu (TW)

( * ) Notice: Subject to any disclaimer, the term of this patent is extended or adjusted under 35 U.S.C. 154(b) by 0 days.

(21) Appl. No.: 09/875,674

(22) Filed: Jun. 6, 2001

(65) Prior Publication Data

US 2002/0094203 A1 Jul. 18, 2002

(30) Foreign Application Priority Data

Jan. 17, 2001 (TW) ........................................ 90200916 U

(51) Int. Cl.[7] ........................ G03B 28/32; G03B 27/52; H04N 5/225
(52) U.S. Cl. ............................ 355/21; 355/64; 348/370; 348/373
(58) Field of Search ............................. 355/21, 64, 65; 396/428; 353/122; 348/373, 370

(56) References Cited

U.S. PATENT DOCUMENTS

| | | | | |
|---|---|---|---|---|
| 4,783,686 A | * | 11/1988 | Ishii et al. ..................... 355/64 |
| 5,642,206 A | * | 6/1997 | Yamamori et al. .......... 348/370 |
| 6,064,426 A | * | 5/2000 | Waterman ..................... 348/63 |
| 6,065,839 A | * | 5/2000 | Miyata et al. ............... 348/370 |
| 6,091,377 A | * | 7/2000 | Kawai ............................ 345/7 |
| 6,300,975 B1 | * | 10/2001 | Yamane ...................... 348/370 |
| 6,317,155 B1 | * | 11/2001 | Ohyama ..................... 348/373 |

* cited by examiner

*Primary Examiner*—Alan A. Mathews

(57) ABSTRACT

A storing structure is used for a document camera. The storing structure includes a camera for picking up an image of a document and having a first lateral side, an extensible arm pivotally connected to the first lateral side of the camera for adjusting a distance between the camera and the document, a base having a second lateral side pivotally connected with the extensible arm for supporting the camera, a first pivot device connected to the first lateral side of the camera and the extensible arm for pivoting the camera, and a second pivot device connected to the extensible arm and the second lateral side of the base for pivoting the extensible arm to store the document camera.

7 Claims, 7 Drawing Sheets

STORING STRUCTURE FOR DOCUMENT CAMERA

FIELD OF THE INVENTION

The present invention relates to a storing structure, and more particularly to a storing structure for a document.

BACKGROUND OF THE INVENTION

Generally, a document camera is used to be a peripheral equipment in a liquid crystal projector. For picking up an image of a document, the document camera is performed in a working condition as shown in FIG. 1. A document camera 10 includes a camera 15, a base 13, an extensible arm 11 having a first hinge 12 connected to the base 13 and a second hinge 14 connected to the camera 15, and two elongated plates 16 (only one shown in FIG. 1) for supporting the camera 10. When the document camera 10 is not at working condition, the document camera 10 is stored as shown in FIG. 2. Therefore, the structure of the document camera according to the prior art is space-consumption and also difficult to carry.

Therefore, the purpose of the present invention is to develop a storing structure for a document camera to deal with the above situations encountered in the prior art.

SUMMARY OF THE INVENTION

It is therefore an object of the present invention to propose a storing structure for a document camera for reducing space-consumption.

It is therefore another object of the present invention to propose a storing structure for a document camera for conveniently carrying.

According to the present invention, there is proposed a storing structure for a document camera. The storing structure includes a camera for picking up an image of a document and having a first lateral side, an extensible arm pivotally connected to the first lateral side of the camera for adjusting a distance between the camera and the document, a base having a second lateral side pivotally connected with the extensible arm for supporting the camera, a first pivot device connected to the first lateral side of the camera and the extensible arm for pivoting the camera, and a second pivot device connected to the extensible arm and the second lateral side of the base for pivoting the extensible arm to store the document camera.

Preferably, the first pivot device includes a first pivoting shaft disposed on one end of the extensible arm for pivoting the camera, a first inner sleeve fastened on the first pivoting shaft for transferring a pressure from the camera to the first pivoting shaft, and a first outer sleeve disposed on the first inner sleeve and connected to the camera for transferring the pressure from the camera to the first inner sleeve. The second pivot device preferably includes a second pivoting shaft disposed on the other end of the extensible arm for pivoting the extensible arm, a second inner sleeve fastened on the second pivoting shaft for receiving a pressure from the second pivoting shaft, and a second outer sleeve disposed on the second inner sleeve and connected to the base for transferring the pressure from the second pivoting shaft to the base.

Certainly, the first pivoting shaft and the second pivoting shaft can be integrally formed with the two ends of the extensible arm, respectively.

According to the present invention, there is proposed a storing structure for a document camera. The storing structure includes a camera for picking up an image of a document and having a first lateral side, a supporting arm pivotally connected to the first lateral side of the camera, a base having a second lateral side pivotally connected with the supporting arm for supporting the camera, a first pivot device connected to the first lateral side of the camera and the supporting arm for pivoting the camera, and a second pivot device connected to the supporting arm and the second lateral side of the base for pivoting the supporting arm to store the document camera.

Preferably, the supporting arm is an extensible arm for adjusting a distance between the camera and the document.

Preferably, the first pivot device includes a first pivoting shaft disposed on one end of the supporting arm for pivoting the camera, a first inner sleeve fastened on the first pivoting shaft for transferring a pressure from the camera to the first pivoting shaft, and a first outer sleeve disposed on the first inner sleeve and connected to the camera for transferring the pressure from the camera to the first inner sleeve. The second pivot device preferably includes a second pivoting shaft disposed on the other end of the supporting arm for pivoting the supporting arm, a second inner sleeve fastened on the second pivoting shaft for receiving a pressure from the second pivoting shaft, and a second outer sleeve disposed on the second inner sleeve and connected to the base for transferring the pressure from the second pivoting shaft to the base.

Certainly, the first pivoting shaft and the second pivoting shaft can be integrally formed with the two ends of the supporting arm, respectively.

The present invention may best be understood through the following description with reference to the accompanying drawings, in which:

DETAILED DESCRIPTION OF THE PREFERRED EMBODIMENTS

Figure 1:
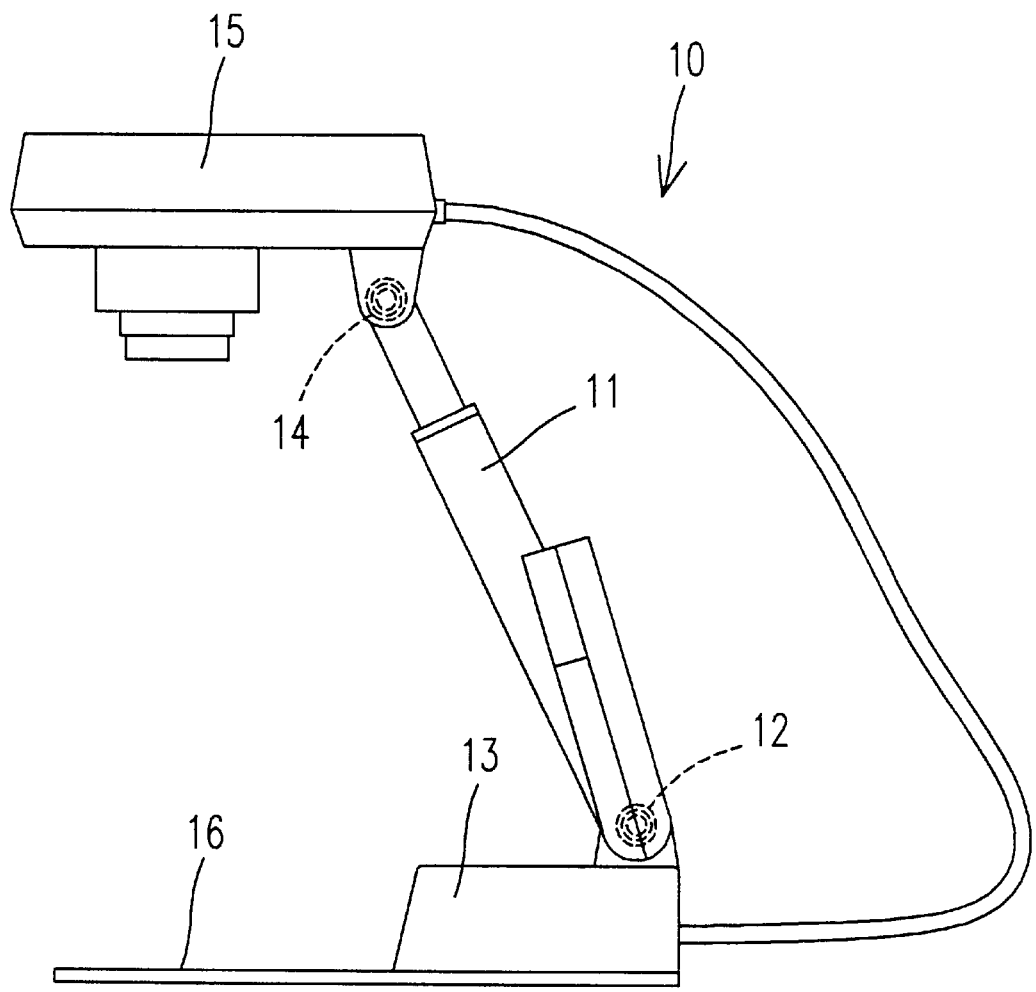
FIG. 1 is a lateral view illustrating a document camera according to the prior art.
Figure 2:
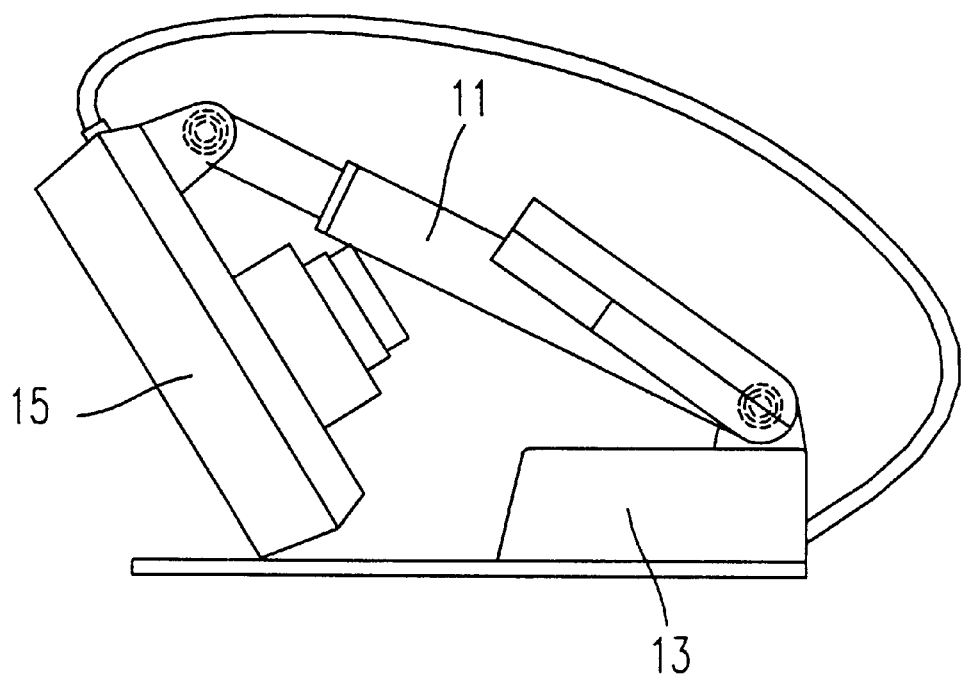
FIG. 2 is a diagram illustrating the document camera of FIG. 1 in a stored condition.
Figure 3:
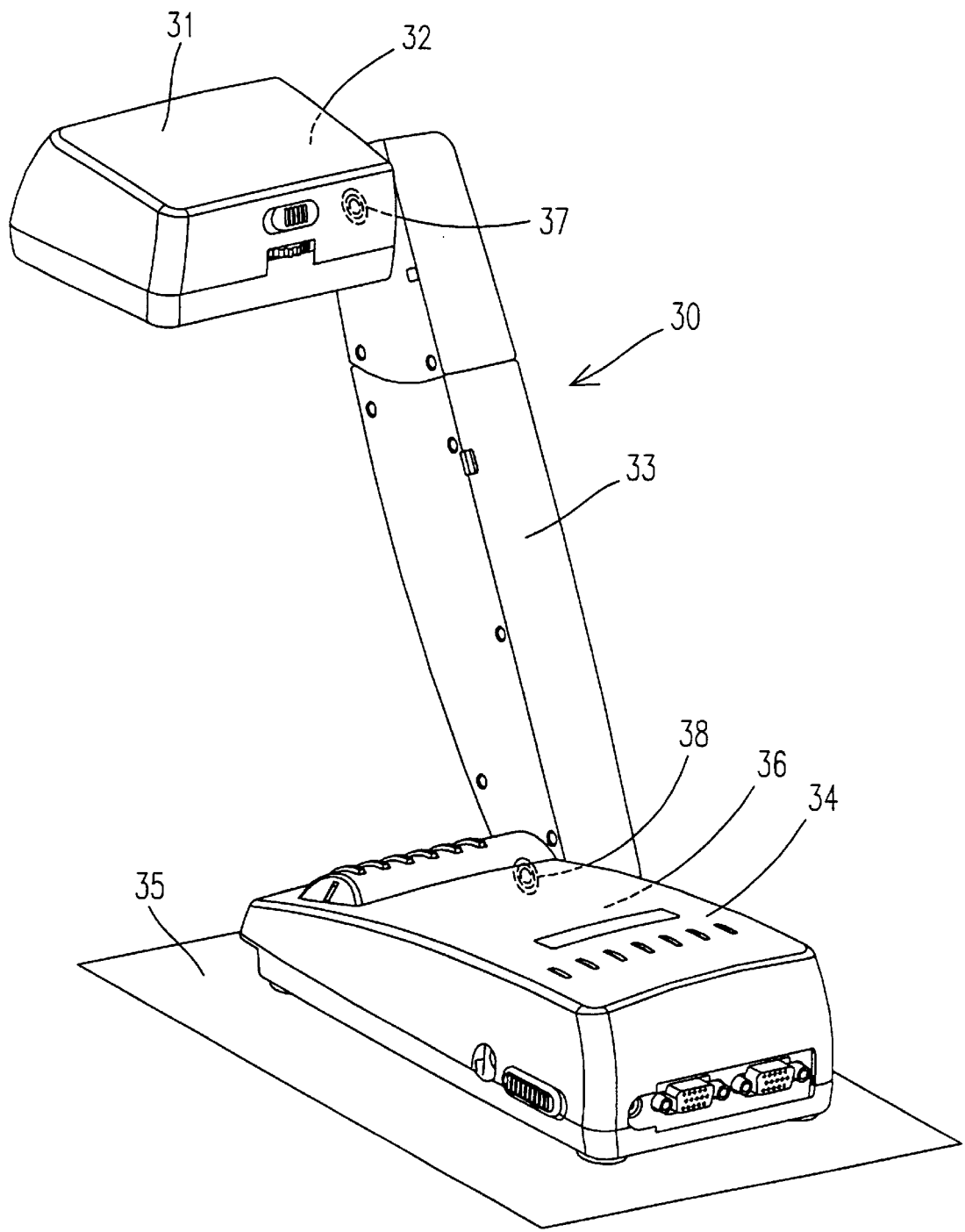
FIG. 3 is a three-dimensional view illustrating a storing structure of a document camera according to a preferred embodiment of the present invention.
Figure 4:
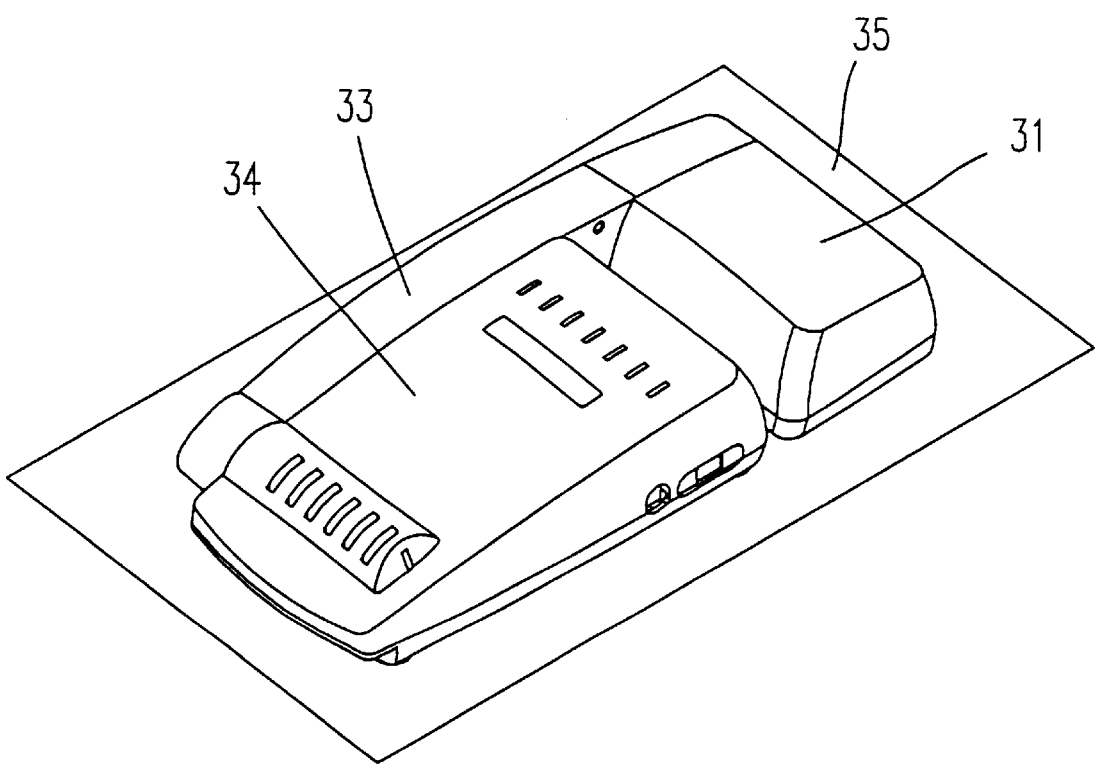
FIG. 4 is a three-dimensional view illustrating the document camera of FIG. 3 in a stored condition.

FIG. 3 is a three-dimensional view illustrating a storing structure of a document camera according to a preferred embodiment of the present invention. As shown in FIG. 3, the storing structure of the document camera 30 includes a camera 31 for picking up an image of a document and having a first lateral side 32, an extensible arm 33, a base 34 having a second lateral side 36, a first pivot device 37, and a second device 38. The extensible arm 33 is pivotally connected to the camera 31 for adjusting a distance between the camera 31 and a document. The base 34 is pivotally connected with the extensible arm 33 for supporting the camera 31. The first pivot device 37 is connected to the first lateral side 32 of the camera 31 and the extensible arm 33 for pivoting the camera 31, and the second pivot device 38 is connected to the extensible arm 33 and the second lateral side 36 of the base 34 for pivoting the extensible arm 33 onto a plane 35 for storing the document camera 30 as shown in FIG. 4.

Figure 5:
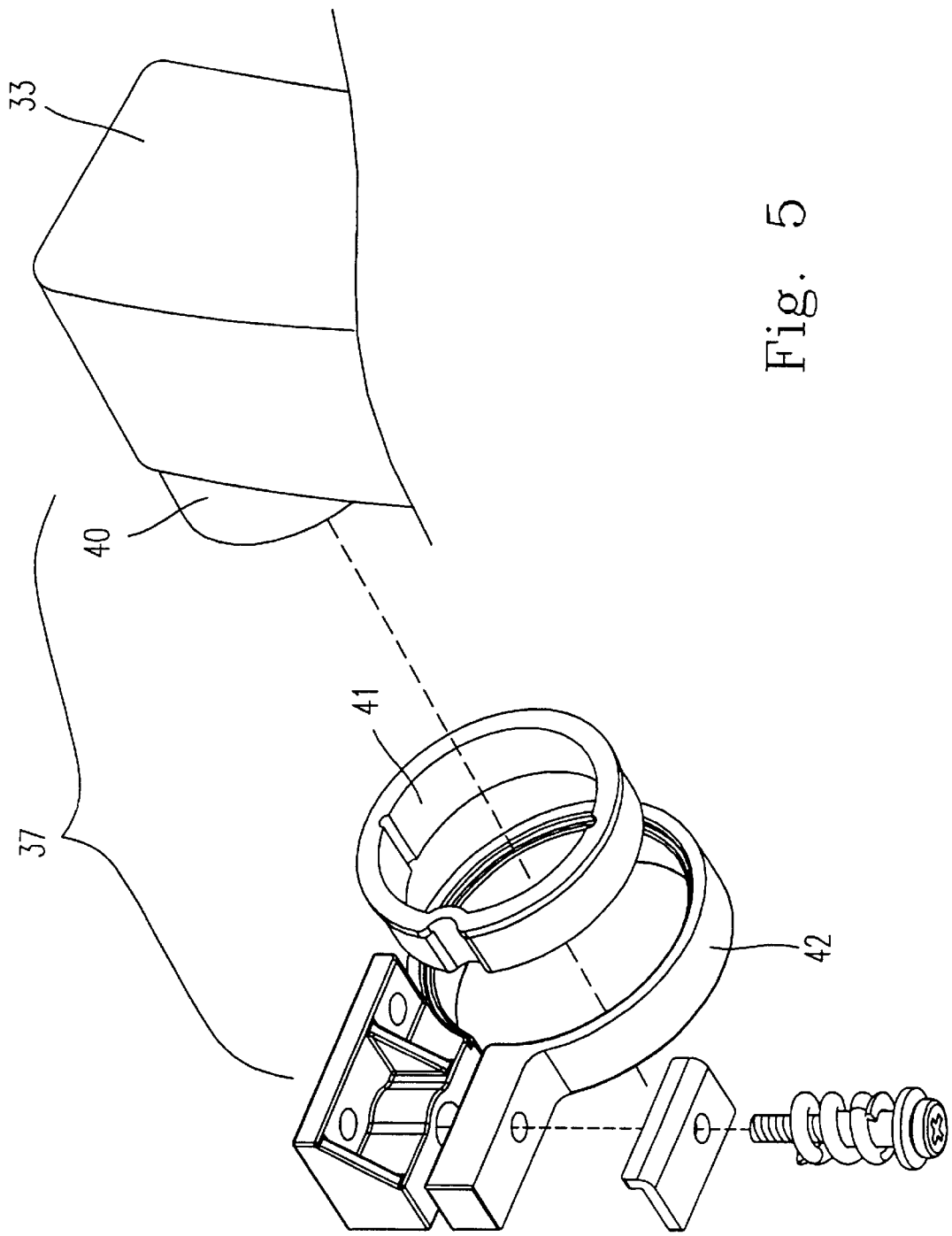
FIG. 5 is a decomposed diagram illustrating a first pivot device of the storing structure of the document camera in FIG. 3.

As shown in FIG. 5, the first pivot device 37 includes a first pivoting shaft 40, a first inner sleeve 41 and a first outer sleeve 42. The first pivoting shaft 40 is disposed on one end of the extensible arm 33 for pivoting the camera 31. The first inner sleeve 41 is fastened on the first pivoting shaft 40 for transferring a pressure from the camera 31 to the first pivoting shaft 40, and the first outer sleeve 42 is disposed on the first inner sleeve 41 and connected to the camera 31 for transferring the pressure from the camera 31 to the first inner sleeve 41. In addition, the first pivoting shaft 40 can be integrally formed with one end of the extensible arm 33.

Figure 6:
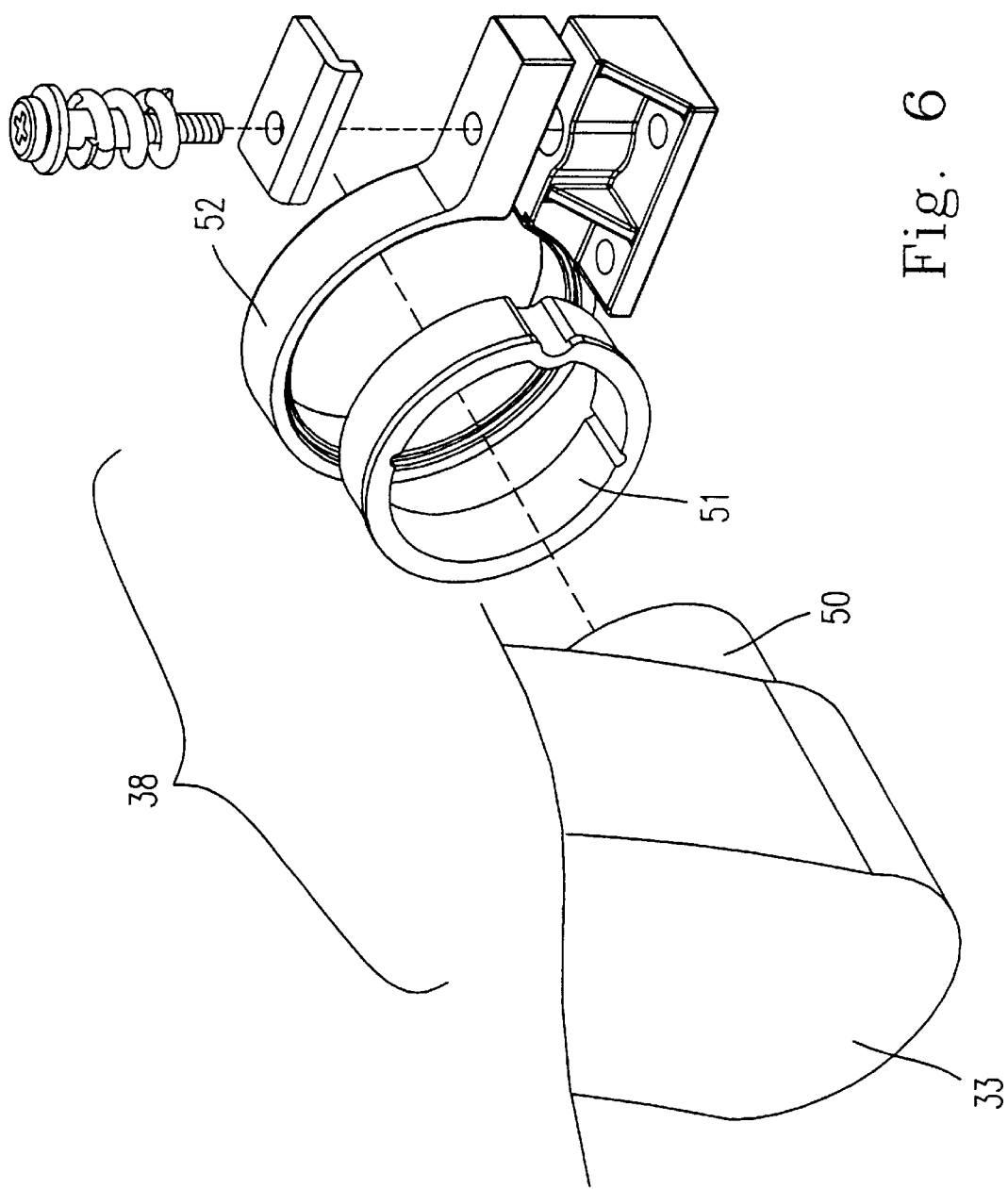
FIG. 6 is a decomposed diagram illustrating a second pivot device of the storing structure of the document camera in FIG. 3.

As shown in FIG. 6, the second pivot device 38 includes a second pivoting shaft 50, a second inner sleeve 51 and a second outer sleeve 52. The second pivoting shaft 50 is disposed on the other end of the extensible arm 33 for pivoting the extensible arm 33. The second inner sleeve 51 is fastened on the second pivoting shaft 50 for receiving a pressure from the second pivoting shaft 50, and the second outer sleeve 52 is disposed on the second inner sleeve 51 and connected to the base 34 for transferring the pressure from the second pivoting shaft 50 to the base 34. In addition, the second pivoting shaft 50 can be integrally formed with the other end of said extensible arm 33.

Figure 7:
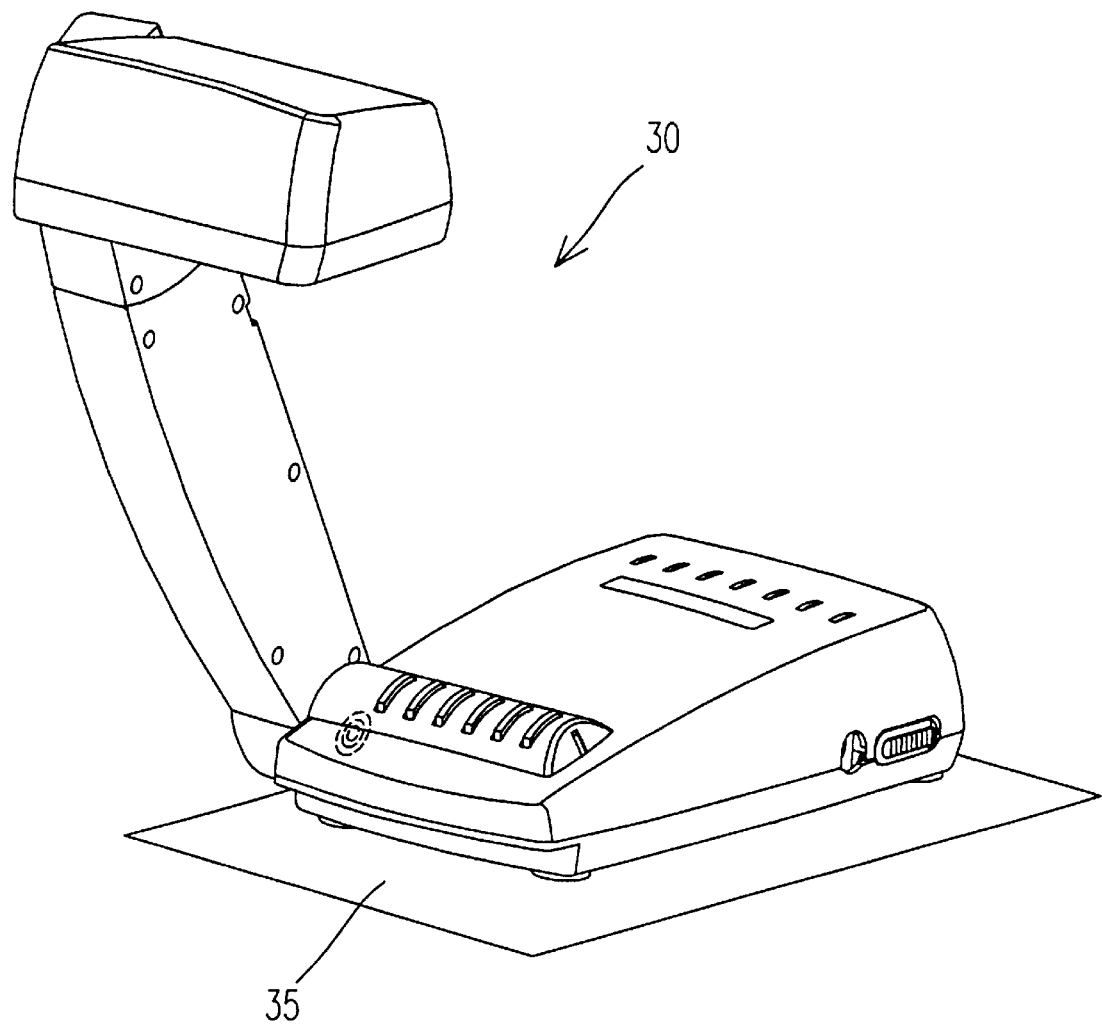
FIG. 7 is a three-dimensional view illustrating the document camera of FIG. 3 under a working condition.

FIG. 7 is a three-dimensional view illustrating a document camera 30 is at a working condition.

In sum, the storing structure of the document camera according to the present invention can reduce the space-consumption for conveniently storing and carrying. Furthermore, the storing structure according to the present invention is also suitable for industrial producing.

While the invention has been described in terms of what are presently considered to be the most practical and preferred embodiments, it is to be understood that the invention need not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A storing structure for a document camera comprising:
    a camera for picking up an image of a document and having a first lateral side;
    an extensible arm pivotally connected to said first lateral side of said camera for adjusting a distance between said camera and said document;
    a base having a second lateral side pivotally connected with said extensible arm for supporting said camera;
    a first pivot device connected to said first lateral side of said camera and said extensible arm for pivoting said camera; and
    a second pivot device connected to said extensible arm and said second lateral side of said base for pivoting said extensible arm to store said document camera,
    wherein said first pivot device having a first pivoting shaft disposed on one end of said extensible arm for pivoting said camera;
    a first inner sleeve fastened on said first pivoting shaft for transferring a pressure from said camera to said first pivoting shaft; and
    a first outer sleeve disposed on said first inner sleeve and connected to said camera for transferring said pressure from said camera to said first inner sleeve.

2. The storing structure according to claim 1, wherein said second pivot device comprises:
    a second pivoting shaft disposed on the other end of said extensible arm for pivoting said extensible arm;
    a second inner sleeve fastened on said second pivoting shaft for receiving a pressure from said second pivoting shaft; and
    a second outer sleeve disposed on said second inner sleeve and connected to said base for transferring said pressure from said pivoting shaft to said base.

3. The storing structure according to claim 2, wherein said first pivoting shaft and said second pivoting shaft are integrally formed with said two ends of said extensible arm, respectively.

4. A storing structure for a document camera comprising:
    a camera for picking up an image of a document and having a first lateral side;
    a supporting arm pivotally connected to said first lateral side of said camera; a base having a second lateral side pivotally connected with said supporting arm for supporting said camera;
    a first pivot device connected to said first lateral side of said camera and said supporting arm for pivoting said camera; and
    a second pivot device connected to said supporting arm and said second lateral side of said base for pivoting said supporting arm to store said document camera,
    wherein said first pivot device having a first pivoting shaft disposed on one end of said supporting arm for pivoting said camera;
    a first inner sleeve fastened on said first pivoting shaft for transferring a pressure from said, camera to said first pivoting shaft; and
    a first outer sleeve disposed on said first inner sleeve and connected to said camera for transferring said pressure from said camera to said first inner sleeve.

5. The storing structure according to claim 4, wherein said supporting arm is an extensible arm for adjusting a distance between said camera and said document.

6. The storing structure according to claim 4, wherein said second pivot device comprises:
    a second pivoting shaft disposed on the other end of said supporting arm for pivoting said supporting arm;
    a second inner sleeve fastened on said second pivoting shaft for receiving a pressure from said second pivoting shaft; and
    a second outer sleeve disposed on said second inner sleeve and connected to said base for transferring said pressure from said second pivoting shaft to said base.

7. The storing structure according to claim 6, wherein said first pivoting shaft and said second pivoting shaft are integrally formed with said two ends of said supporting arm, respectively.

* * * * *